(12) United States Patent
Hoeppner

(10) Patent No.: US 11,172,107 B1
(45) Date of Patent: Nov. 9, 2021

(54) OPTICAL PATH ALIGNMENT GUIDE

(71) Applicant: Charles Hoeppner, Jacksonville, FL (US)

(72) Inventor: Charles Hoeppner, Jacksonville, FL (US)

( * ) Notice: Subject to any disclaimer, the term of this patent is extended or adjusted under 35 U.S.C. 154(b) by 0 days.

(21) Appl. No.: 17/077,591

(22) Filed: Oct. 22, 2020

(51) Int. Cl.
*H04N 5/225* (2006.01)
*G03B 17/56* (2021.01)

(52) U.S. Cl.
CPC .......... *H04N 5/2254* (2013.01); *G03B 17/565* (2013.01)

(58) Field of Classification Search
CPC .............................. H04N 5/2254; G03B 17/565
See application file for complete search history.

(56) References Cited

U.S. PATENT DOCUMENTS

| | | | |
|---|---|---|---|
| 3,935,380 A | 1/1976 | Coutta | |
| 4,027,329 A | 5/1977 | Coutta | |
| 5,453,849 A * | 9/1995 | Copenhaver | G02B 27/0983 313/114 |
| 8,505,461 B2 | 8/2013 | Phillips | |
| 8,660,698 B2 | 2/2014 | Phillips | |
| 10,091,406 B2 | 10/2018 | Oh | |
| 2020/0160012 A1* | 5/2020 | Nunnink | H04N 5/225 |

* cited by examiner

*Primary Examiner* — Lin Ye
*Assistant Examiner* — John H Morehead, III
(74) *Attorney, Agent, or Firm* — Lawrence J. Gibney, Jr.

(57) ABSTRACT

It is critical to take high resolution images of the sides of a train while the train is moving. A lens cap with a slit will be placed over the camera lens to direct the focus of the camera, which is likely a line scan camera. In addition to the lens cap a pair of blinders will extend a certain distance outward from the camera to block dust and debris and ambient light. A anti-reflective surface will be placed on the interior of the surface of the blinders to prevent glare and ambient light from interfering with the image that will be taken by the camera.

3 Claims, 6 Drawing Sheets

OPTICAL PATH ALIGNMENT GUIDE

FIELD OF THE INVENTION

This application teaches a device that will allow the user to take high resolution images of a moving train using a plurality of line scan cameras that are mounted to a truss through which a train will pass. One of the challenges for taking high speed images in this environment is the presence of airborne contaminants that will affect the image(s) that is being taken. This interference can be caused by debris or dust that cause interfere with the camera view by producing smudges on the lens of the camera. If a smudge does appear on the camera lens the presence of ambient light will accentuate the smudge on the camera lens and this will cause a distorted image. If ambient light is allowed to effect the image on a lens that is smudged by debris or other contaminants the quality of the picture is negatively impacted because the image will duplicate the smudge instead of the surface of the train. In this application, a lens cap is initially placed over the camera lens and helps to direct the line of sight for the camera lens while at the same time to protect the lens from the inevitable dirt and airborne contaminants. After the lens cap is installed, a pair of blinders are mounted on the side(s) of the camera to reduce the interference of airborne contaminants that will be present in the field. The blinders will block most of the airborne contaminants as well as any ambient light that may negatively impact the image that is produced. This optical path alignment guide is critical in ensuring that the cameras perform their function to take high resolution images. The slit that is used to take the pictures is 14 micrometers. It is anticipated that line scan cameras will be used because the lens is directed to a small area instead of a wider view that is produced by other types of cameras.

PRIOR ART

There are many prior art references that discuss cameras and directing the camera to take an image of a moving object whether that object be a moving train or items on a conveyor belt. The field of trains produce unique challenges in terms of the ability to take high resolution images. Trains are routed through areas that contain large amounts of debris and are away from the densely populated areas. A representative example of the type of devices that are used to capture images can be found at Coutta U.S. Pat. No. 3,935,380. This teaches a method and device to capture images using a surveillance systems. Similarly, another example can be found at Coutta. U.S. Pat. No. 4,027,329. While the Coutta references do not specifically teach systems that are used in a train based application it does teach the equipment that is used in this type of system; the type of equipment that is used (cameras, lighting) is not novel. Other examples include Phillips U.S. Pat. No. 8,505,461 and Phillips U.S. Pat. No. 8,660,698 that teach live inspection robots. Neither Phillips references discuss the use of this device in a train environment that has its own unique challenges.

BRIEF SUMMARY OF THE INVENTION

It is important for the safety and general maintenance of the train to ensure that clear images of the train are taken as the train passes through a truss structure, which are large structures in the field. On the side of the truss and across the top of the truss is a plurality of lights that will direct light on the surfaces of the train as the train passes through the truss. The purpose of the lighting is to block out any ambient light that may exist.

On the opposite side of the truss will be a plurality of cameras with blinders that will take pictures of the sides of the train as it passes through the truss. The range of the lens images of the pictures will be in the range of 14 micrometers.

The plurality of cameras will take pictures of the sides of the train to document the integrity of the train to include but not limited to air hoses, side walls of the train, knuckles and hasps of the train to name a few of the components of the train. These images will provide a visual image that can be transmitted to a remote location for possible remedial action. Any structural abnormality that may produce failure will create havoc for the train as well as the personnel aboard the train and the population in the area and it is important to be constantly vigilant regarding the structural integrity of the train.

In the past this inspection was accomplished by manually inspecting the sides of the train to check the integrity of hoses, knuckles, and hasps to name a few items. This manual inspection was time consuming and labor intensive and involved lost productivity as the train was forced to be stationary during these inspection periods.

Currently high-resolution images of the sides of a train can be taken with a camera that is positioned at various locations on the truss as the train passes through the truss structure. It is anticipated that the camera to be used will be line scan cameras that produce images in a narrow range of a field as opposed to cameras that produce a broader view of an area.

Train travel, as you would expect, creates a great deal of environmental debris in the form of dust, metal fragments, and rocks to name just a few items. Because a camera is being used to capture the images it is important to make sure that the camera lens is not covered or smudged. If the camera lens is smudged and ambient light strikes the lens the smudge will be highlighted and the quality of the image will be negatively impacted. The presence of this debris will effect the quality of images.

In operation dust or glare will interfere with the quality of the images that are captured by the camera because the ambient light will highlight the smudge.

This Optical Path Alignment Guide will extend outward from the camera on the sides of the camera; initially a lens cover with a slit is provided to reduce the introduction of airborne contaminants on the lens cover. The slit is a very small sliver or line, slightly larger than 14 micrometers. The type of camera that is used is a line scan camera that is manufactured to take very precise images in a very narrow range. In addition to the slit on the lens cap, a pair of blinders extend outward from the camera and are secured to the camera to block ambient light to prevent glare or dust from interfering with the quality of the image taken by the camera. The blinders extend a predetermined distance from the camera to eliminate much of the dust and the glare that is produced by ambient light. The interior surface of the blinders will have an anti-reflective surface to prevent excessive amounts of glare but at the same time permit the camera to operate normally.

NUMBERING REFERENCES

5 Camera
10 Blinders
15 Bracket Base
20 Groove Base
25 Pan Head Screw
30 Anti-Reflective Wall
40 Truss
45 Truss Lighting

DETAILED DESCRIPTION OF THE EMBODIMENTS

Figure 1:
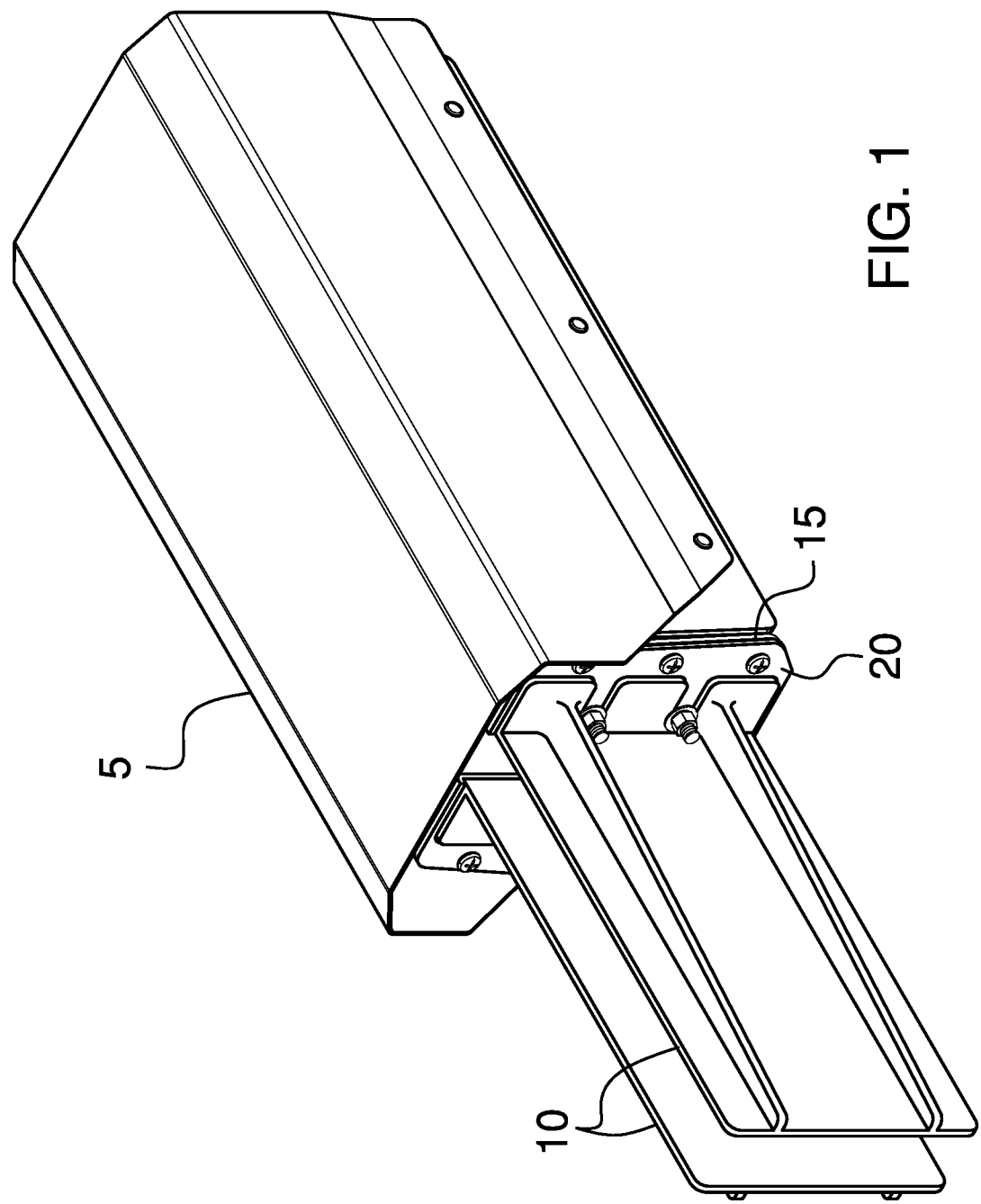
FIG. 1 is an isometric view of the camera with the blinders attached to the side of the camera.
Figure 2:
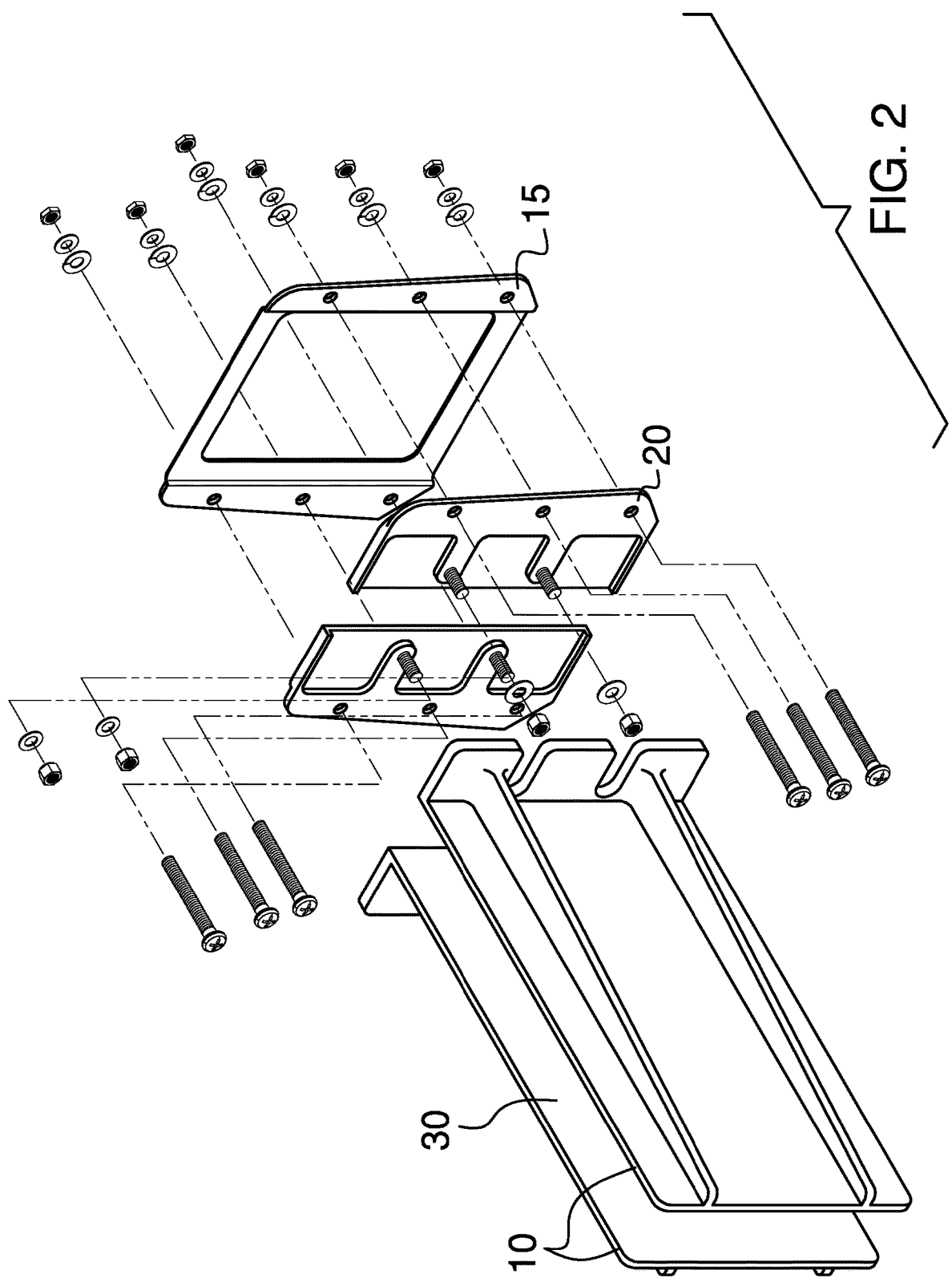
FIG. 2 is an exploded view of the blinders and the attachment means
Figure 3:
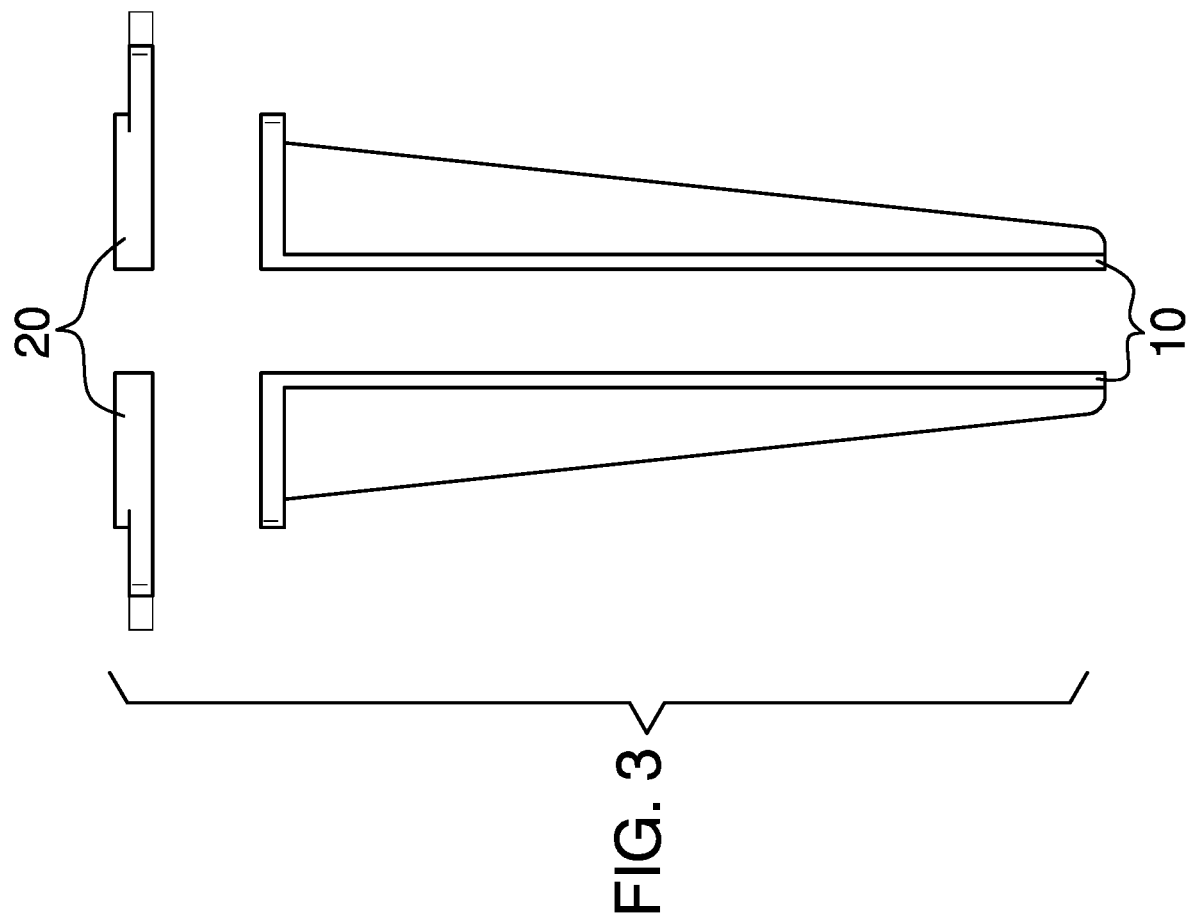
FIG. 3 is a top view of the blinders
Figure 4:
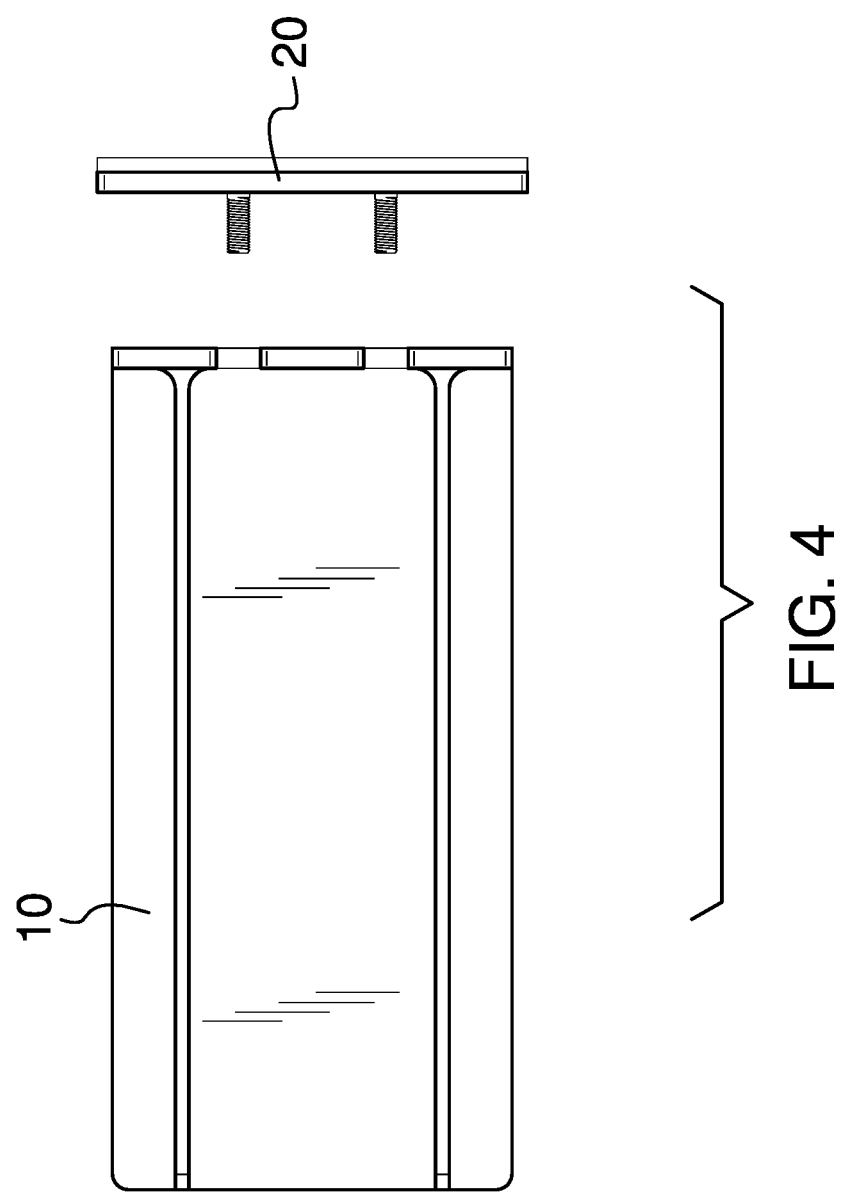
FIG. 4 is a side view of the blinders
Figure 5:
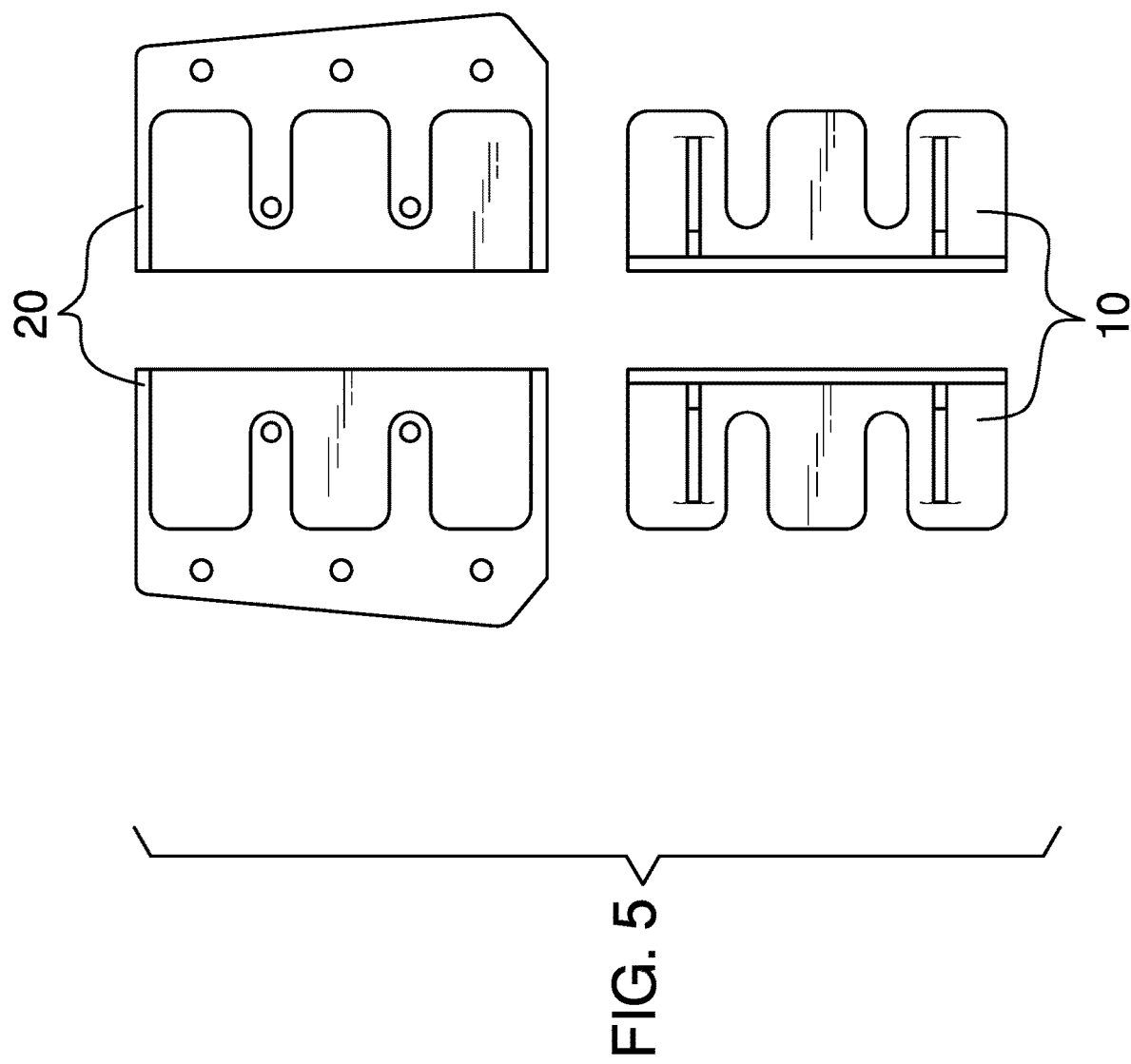
FIG. 5 is a front view of the blinders.
Figure 6:
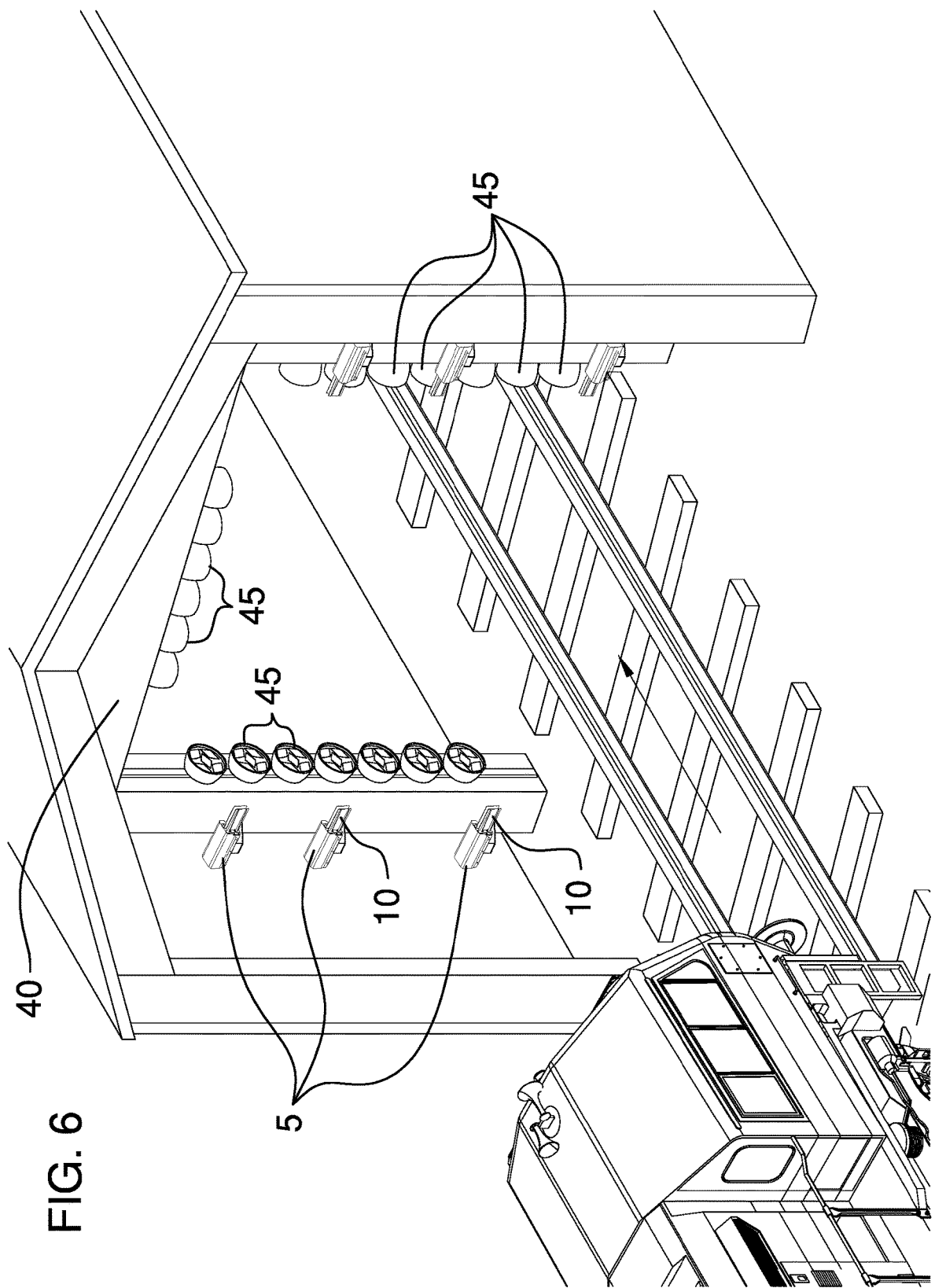
FIG. 6 is an in-use view of the lighting and cameras with the blinders installed on a truss in the field.

A plurality of cameras 5 will take high speed resolution images of the sides of a train as the train passes through a truss 40 such as depicted in FIG. 6. The cameras with the blinders 5 are placed on the side of the truss 40; a source of external lighting 45 is provided on the sides including the top of the truss as the train moves through the truss.

The external lighting 45 is designed to provide sufficient light for the cameras to take high quality images while at the same time to prevent any ambient light from interfering with the quality of the image that is taken by the cameras that are taken.

As depicted in FIG. 6 the lighting and the camera placement are positioned on opposite sides of the truss and the top structure. The operation of the lighting and the cameras are activated as the train approaches the truss structure; the lighting and the cameras are shut off after the train has left the truss.

As the train passes through the truss 40 the plurality of cameras 5 will take high quality images. The images may be stitched together and forwarded to a remote location for examination. It is anticipated that the camera be a line scan camera that will have a range of 14 micrometers. These images from the camera may also be stitched together to form the image of each individual train car; each individual train car may then be stitched together to form a train. The re-stitched images will then be compiled together and sent electronically to a remote facility for appropriate action.

Before the images can be taken, it is critical that the lens of the camera be kept as clean as possible and that the image is not affected by dust or other environment debris and ambient light. Dust and debris are commonplace while a train is moving over the tracks.

If debris is on the lens of the camera, it will distort the image that is taken by the camera and produce less than high resolution images. In addition to the lens cap with a slit, a pair of blinders 10 will be mounted on the camera and extend outward from the camera a predetermined distance.

A bracket base 15 on the surface of the camera is provided to mount the blinders 10. A groove base 20 will mount to the bracket base and the blinders 10 will be secured to the groove base 20. The blinders 10 will extend a predetermined distance away from the camera 5.

The blinders 10 will be mounted on the groove base 20 with screws 25 with appropriate lock nuts and washers. Other means to mount the blinders to the camera may also be provided. Regardless of the means to mount the blinders 10 the type of mechanism should be sturdy and durable to not be loosened by the vibration that is caused by the train.

It is important that the groove base which mounts the blinders 10 are positioned parallel to each other and perpendicular to the camera.

On the interior surface of the blinder will be antireflective surface or wall 30. The anti-reflective surface 30 will reduce the glare that would interfere with the image that is taken by the camera.

The blinders 10 can be easily removed from the groove base 20; the groove base 20 in turn is also removable from the bracket base 15. This allows easy replacement of the blinders if the blinders become damaged.

The inventor claims:

1. An optical path alignment guide, which is comprised of
   a. a camera;
   wherein the camera has a first end and a second end;
   wherein a bracket base is attached to the first end of the camera;
   wherein a groove base is attached to the bracket base;
   wherein the camera has a lens;
   wherein the camera produces an image;
   b. a lens cover;
   wherein the lens cover is a predetermined size;
   said lens cover fits over the lens of the camera;
   wherein a slit is provided on the lens cover;
   c. a pair of blinders,
   wherein the pair of blinders are a predetermined shape;
   wherein the pair of blinders have an interior surface and an exterior surface;
   wherein the pair of blinders extend a predetermined distance from the first end of the camera;
   wherein the pair of blinders are parallel to each other;
   wherein the pair of blinders are positioned perpendicular to the camera;
   an antireflective surface;
   wherein an anti-reflective surface is placed on the interior surface of the pair of blinders;
   d. a means to secure the blinders provided where the blinders are secured to the groove base;
   e. external lighting;
   wherein external lighting is provided.

2. The optical path alignment guide wherein the camera is a line scan camera.

3. The optical path alignment guide wherein the image from the camera is in a range of fourteen micrometers.

* * * * *